(12) United States Patent
Majors

(10) Patent No.: US 8,967,650 B1
(45) Date of Patent: Mar. 3, 2015

(54) VEHICLE LADDER

(71) Applicant: Lex D. Majors, Hydro, OK (US)

(72) Inventor: Lex D. Majors, Hydro, OK (US)

( * ) Notice: Subject to any disclaimer, the term of this patent is extended or adjusted under 35 U.S.C. 154(b) by 0 days.

(21) Appl. No.: 14/078,179

(22) Filed: Nov. 12, 2013

(51) Int. Cl.
B60R 3/00 (2006.01)
(52) U.S. Cl.
USPC .......................................... 280/163
(58) Field of Classification Search
USPC ................. 280/163, 164.1, 166, 770
See application file for complete search history.

(56) References Cited

U.S. PATENT DOCUMENTS

| 3,692,354 | A |   | 9/1972 | Tuerk |
| D293,667 | S | * | 1/1988 | Weiler .......................... D12/203 |
| 5,024,292 | A |   | 6/1991 | Gilbreath et al. |
| 5,163,531 | A |   | 11/1992 | Whiting |
| 5,799,961 | A |   | 9/1998 | Schmeets |
| 5,964,317 | A |   | 10/1999 | Lattavo |
| 6,003,633 | A |   | 12/1999 | Rolson |
| 6,578,666 | B1 |   | 6/2003 | Miller |
| 6,857,677 | B1 |   | 2/2005 | Giles et al. |
| 7,293,788 | B1 |   | 11/2007 | Bosley et al. |
| 8,261,880 | B1 |   | 9/2012 | Hop |
| 8,322,490 | B1 |   | 12/2012 | Loemker |
| 2007/0273123 | A1 |   | 11/2007 | Wilson |
| 2009/0183946 | A1 |   | 7/2009 | Prebola |
| 2010/0007164 | A1 |   | 1/2010 | Harrison |
| 2010/0096215 | A1 |   | 4/2010 | McFarlane |

* cited by examiner

Primary Examiner — John Walters
Assistant Examiner — James Triggs

(57) ABSTRACT

An elevated vehicle surface access apparatus comprising a step; a first and second rail extending from the step in a spaced relationship to each other so that the step and the first and second rail cooperate to define a foot receiving space; a first hook extending from the first rail and configured to engage one side of a vehicle stake pocket; a second hook extending from the second rail and configured to engage another side of the stake pocket; the first and second rail movable relative to one another such that the first and second hook are positionable in an engagement position wherein the first and second hook are spaced to supportingly engage opposing sides of the stake pocket and in a non-engagement position wherein the first and second hook are spaced relative one another to pass around the sides of the stake pocket.

20 Claims, 5 Drawing Sheets

VEHICLE LADDER

BACKGROUND

1. Field of the Inventive Concepts

The inventive concepts disclosed herein relate generally to ladder devices for accessing vehicles. More particularly, but not by way of limitation, the inventive concepts relate to a removable portable step apparatus for accessing an elevated surface of a vehicle, such as a flatbed trailer.

2. Brief Description of the Related Art

Many vehicles, such as flatbed trailers, have elevated portions that are difficult to access from the ground. For example, the surface of flatbed trailers may be forty-two inches above the road. Users must repetitively access the surface of the flatbed trailer. For instance, a user may need to load and secure cargo on the trailer, transport the cargo, then unstrap and unload the cargo. Ladders may be used for this purpose. Some ladder devises have been proposed that are angled from the side of the vehicle. However, state and federal regulations limit the width of vehicles traveling the roads. To meet the width requirements, the ladder devise must be removed while traveling on the roads. The removed ladder requires additional time for setting up and taking down every time the ladder is needed as well as additional space for storage.

Therefore, a need exists for an apparatus for accessing an elevated surface of a vehicle that is removable and portable but that can remain on the vehicle during travel without violating width restrictions. It is to such an apparatus that the inventive concepts disclosed herein are directed.

DETAILED DESCRIPTION OF EXEMPLARY EMBODIMENTS

Figure 1:
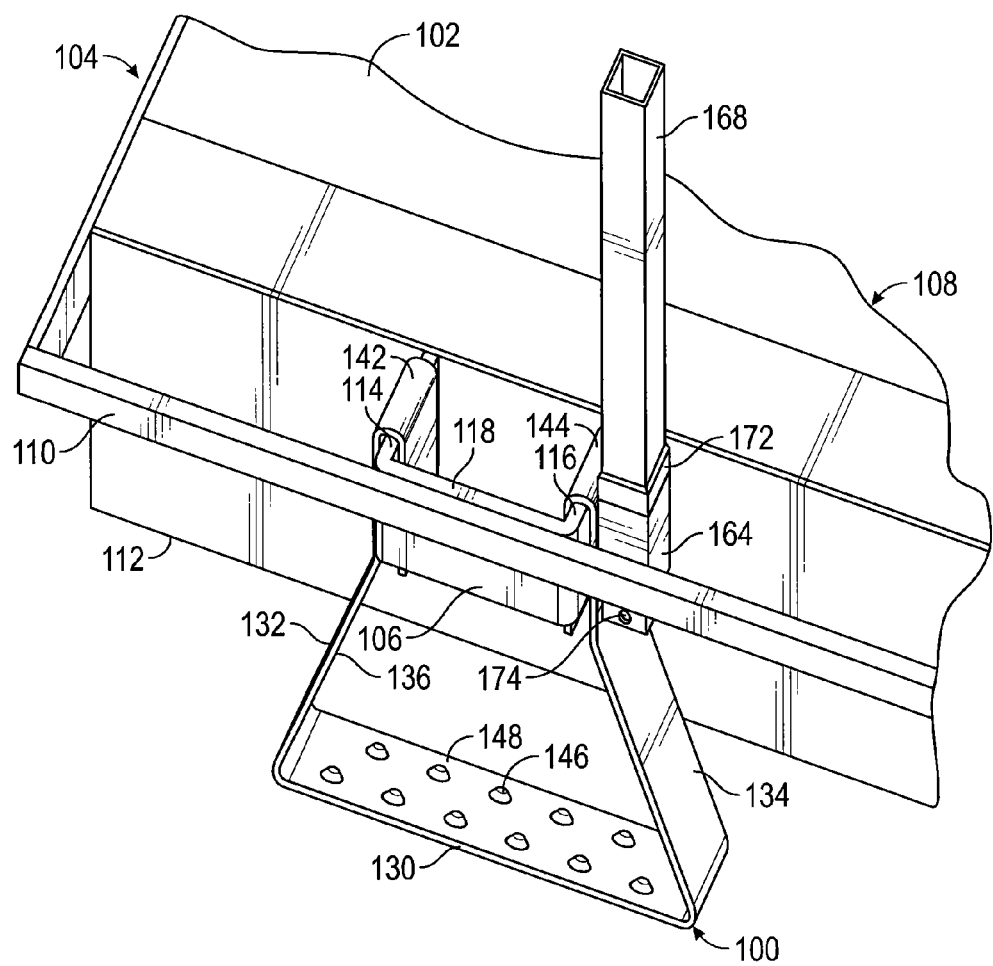
FIG. 1 is a perspective view of an exemplary embodiment of an apparatus for accessing an elevated surface of a vehicle, mounted on the vehicle, constructed in accordance with the inventive concepts disclosed herein.

As used herein, the terms "comprises," "comprising," "includes," "including," "has," "having" or any other variation thereof, are intended to cover a nonexclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIGS. 1-5, an apparatus 100 for accessing an elevated surface 102 of a vehicle 104 is illustrated. The apparatus 100 is particularly suited to be mounted to a stake pocket 106 of the vehicle 104 or any structure similar in construction to a stake pocket. Nonexclusive examples of vehicles 104 with stake pockets 106 upon which the apparatus 100 may be mounted include trucks, truck tractors, trailers, semitrailers, or combinations thereof. It will be understood that the apparatus 100 may be used to access any structure having an elevated surface and a member substantially similar to the stake pocket 106. In the exemplary embodiment of FIGS. 1-4, the vehicle 104 with the elevated surface 102 is shown to be a flatbed trailer 108. Flatbed trailers 108 and stake pockets 106 are well known in the art and thus will not be described in detail herein. For example, exemplary flatbed trailers 108 with stake pockets 106 are described in U.S. Pat. No. 3,692,354, "Truck Stake Arrangement," issued Sep. 19, 1972, as well as in U.S. Patent Publication Number US 2010/0007164 A1, entitled "Universal Sleeve for T-Stakes in a Flatbed Trailer Sidewall System," published Jan. 14, 2010, which are hereby incorporated herein by reference in their entirety.

Figure 2:
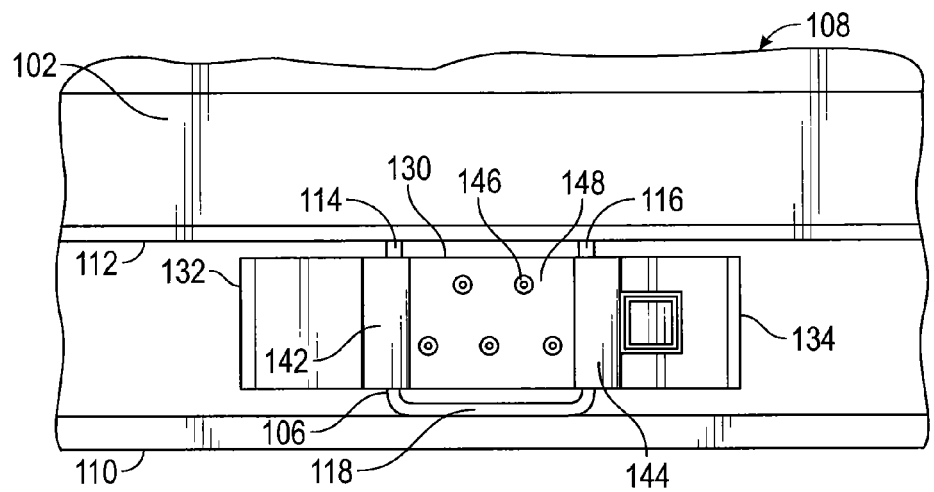
FIG. 2 is a top plan view of the mounted apparatus of FIG. 1.
Figure 4:
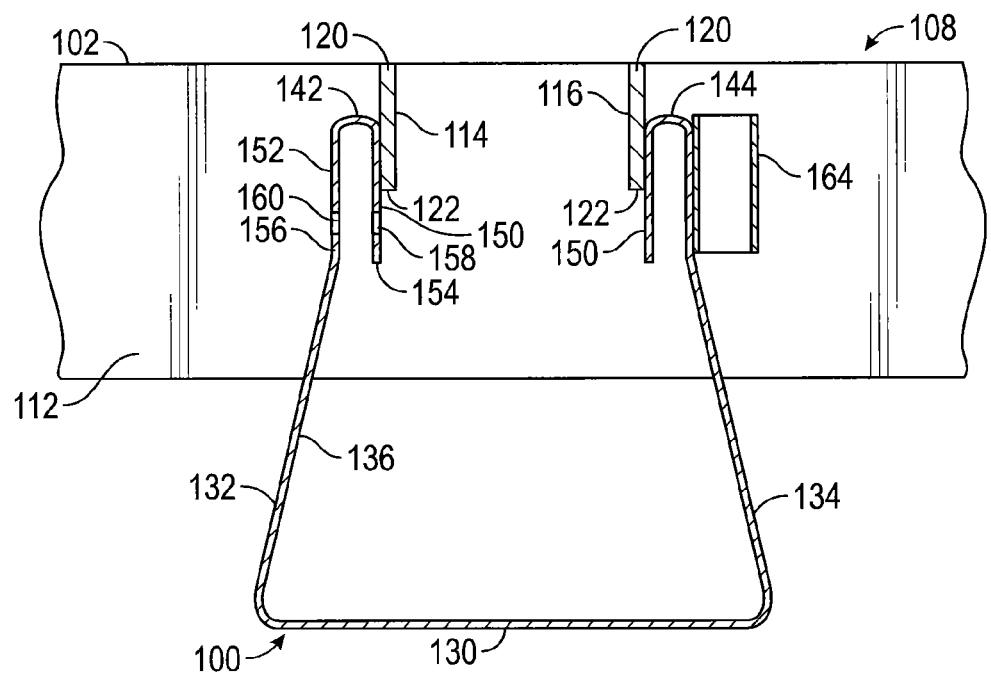
FIG. 4 is a cross-sectional view of the apparatus of FIG. 1 shown in a non-engagement position.

Typically, the flatbed trailer 108 has a rail 110 extending along sides 112 of the flatbed trailer 108. The flatbed trailer 108 may have one or more stake pockets 106 located between the side 112 of the flatbed trailer 108 and the rail 110. As shown in FIG. 2, the stake pocket 106 has a first side 114 and a second side 116 extending a width substantially perpendicularly from the side 112 of the flatbed trailer 108. The stake pocket 106 may have a third side 118 connecting the first and second sides 114, 116. Alternatively, the rail 110 may act to connect the first and second sides 114, 116 of the stake pocket 106. The sides 114,116 of the stake pocket 106 may form a through-hole space between the sides 114, 116 of the stake pocket 106. As shown in FIG. 4, the sides 114, 116 of the stake pocket 106 have a top 120 and a bottom 122.

Figure 5:
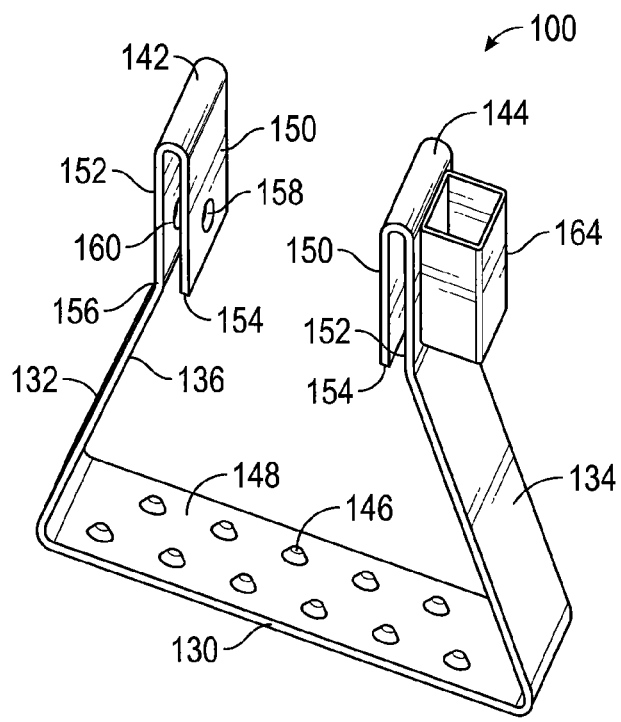
FIG. 5 is a perspective view of the apparatus of FIG. 1.

Referring to FIG. 5, the apparatus 100 has a step 130, a first rail 132 extending from the step 130, and a second rail 134 extending from the step 130 in a spaced relationship to the first rail 132 so that the step 130, the first rail 132, and the second rail 134 cooperate to define a foot receiving space 136. The apparatus 100 further has a first hook 142 extending from the first rail 132 and configured to engage the first side 114 of the stake pocket 106 and a second hook 144 extending from the second rail 134 and configured to engage the second side 116 of the stake pocket 106. In one embodiment, the first and second rails 132, 134 are angled inwardly toward one another. It will be appreciated that the angle may be varied depending on the length desired for the step 130.

The first rail 132 and the second rail 134 are movable relative to one another in a way that the first hook 142 and the second hook 144 are positionable between an engagement position (FIGS. 1-3) and a non-engagement position (FIG. 4). In the engagement position, the first hook 142 and the second hook 144 are spaced to supportingly engage opposing sides 114, 116 of the stake pocket. In the non-engagement position, the first hook 142 and the second hook 144 are spaced relative one another to pass around the sides 114, 116 of the stake pocket 106. In one embodiment, the rails 132, 134 are moveable relative to one another through flexion of the material of the rails 132, 134 and/or the hooks 142, 144.

As shown in FIG. 5, the first hook 142 and the second hook 144 extend in an opposing relationship to one another and in an inwardly direction. In such a configuration, when in the non-engagement position, the first hook 142 and the second hook 144 are spaced apart a greater distance than when the first hook 142 and the second hook 144 are in the engagement position.

Figure 6:
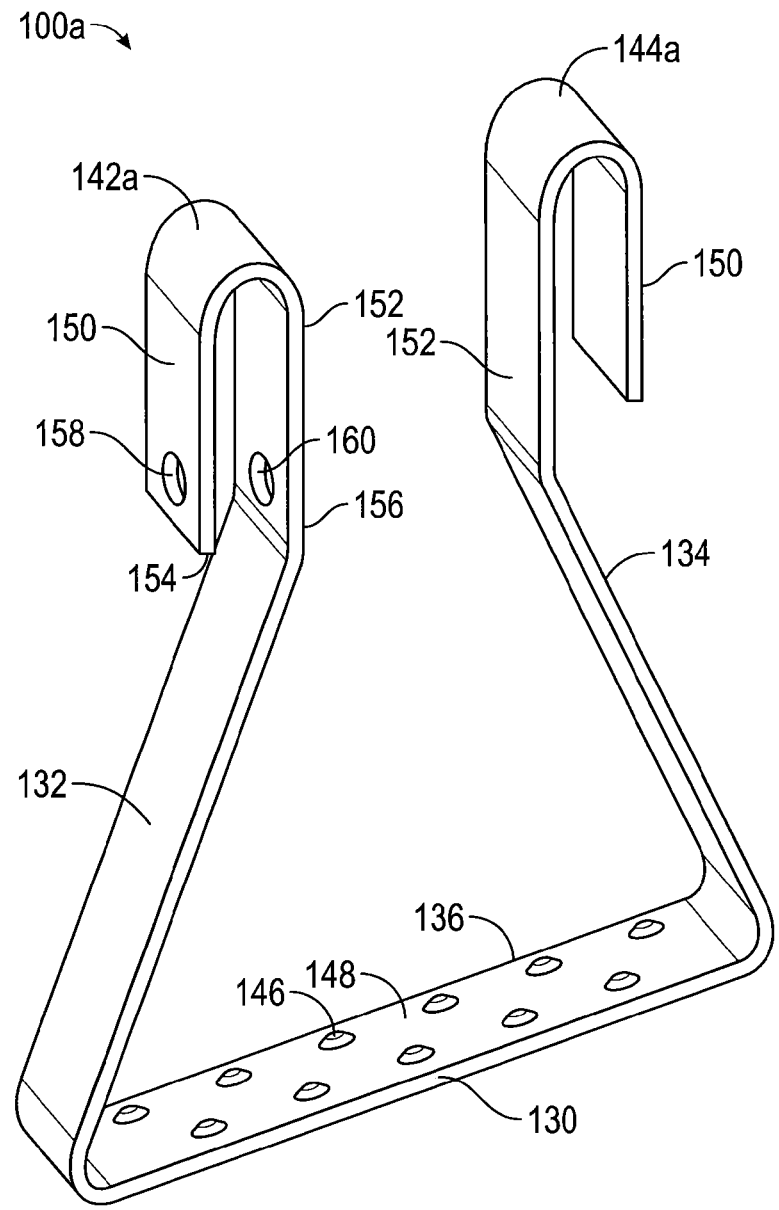
FIG. 6 is a perspective view of another embodiment of an apparatus for accessing an elevated surface of a vehicle.

Alternatively, as illustrated in FIG. 6, a first hook 142a and a second hook 144a of another embodiment of an apparatus 100a may extend in an outwardly direction such that in the non-engagement position, the first hook 142a and the second hook 144a are spaced apart a lesser distance than when the first hook 142a and the second hook 144a are in the engagement position.

Returning now to FIGS. 1 and 2, the first and second hooks 142, 144 have a width substantially similar to the width of the stake pocket 106 such that the first and second hooks 142, 144 in the engagement position substantially span the length of the sides 114, 116 of the stake pocket 106. The substantially similar dimensions provide stability for the apparatus 100 when mounted such that horizontal and rotational movement is limited by the side 112 of the flatbed trailer 108 and/or the rail 110. When a user utilizes the step 130, horizontal force from the user's motion onto the step 130 is translated into the side 112 of the flatbed trailer 108 and/or the rail 110 while the apparatus 100 remains relatively stable.

In one embodiment, at least a portion of the step 130 may include a non-slip texture 146. For example, the top surface 148 of the step 130 with which the user's foot comes into contact may have a non-slip texture 146. Nonexclusive examples of the non-slip texture 146 include welded metal protrusions, a roughened surface, and a secondary surface (such as adhesive backed texture strip or strips).

In one embodiment, as shown in FIG. 2, the step 130, the first rail 132, the second rail 134, the first hook 142, and the second hook 144 are in a substantially co-planar relationship. The substantially coplanar relationship results in the footprint of the apparatus 100 not extending beyond the width of the flatbed trailer 108.

Figure 3:
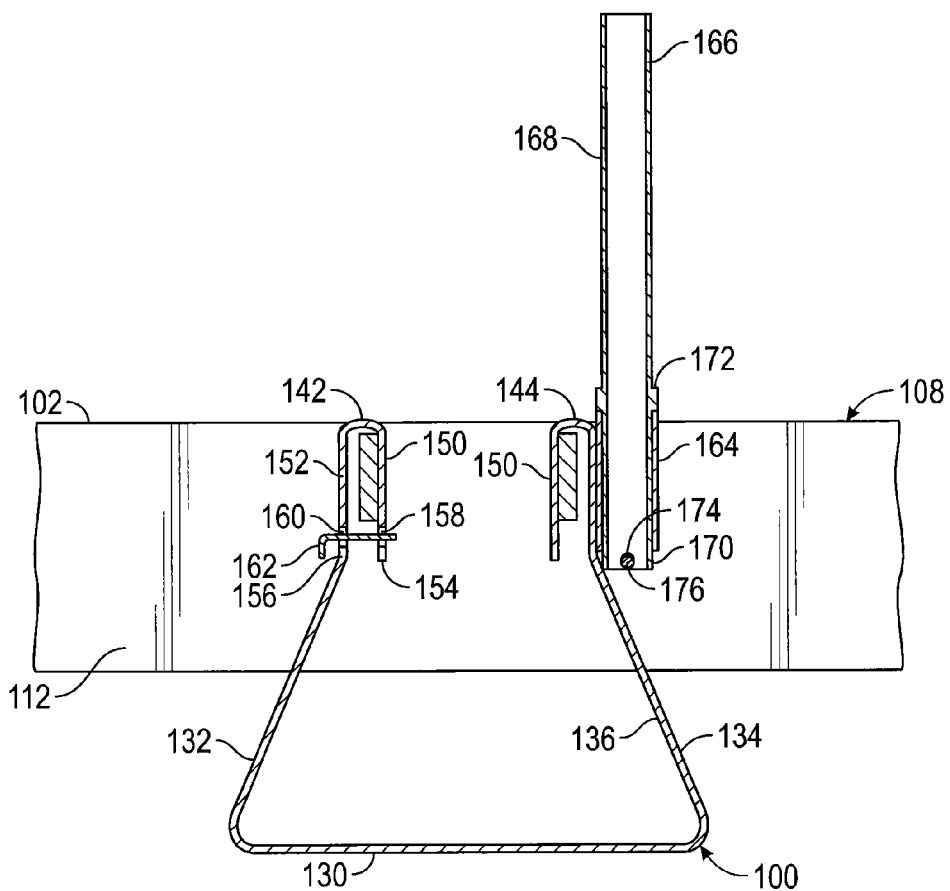
FIG. 3 is a cross-sectional view of the apparatus of FIG. 1 shown in an engagement position.

In one embodiment, as shown in FIG. 3, the first hook 142 and the second hook 144 each has a first arm portion 150 and a second arm portion 152. The first arm portion 150 may have a first distal end 154 and the second arm portion 152 may have a second distal end 156. The first and second arm portions 150, 152 may be configured such that the distal ends 154, 156 extend beyond the sides 114, 116 of the stake pocket 106 when the hooks 142, 144 are in the engagement position. The first distal end 154 of the first arm portion 150 of the first hook 142 and/or of the second hook 144, may have a through-hole 158 aligned with a through-hole 160 in the second distal end 156. The through-holes 158, 160 are configured to receive a locking member 162. Nonexclusive examples of locking members include pins, bolts, hitch pins, clevis pins, clips, retainer clips, padlocks, and/or combinations thereof. It will be understood that any type of locking member 162 may be used that is capable of securing the hook 142 and/or 144 beneath the side 114 and/or 116 of the stake pocket 106 such that the apparatus 100 is secured to the vehicle 104.

In one embodiment, the apparatus 100 has a receiving tube 164 attached to the first hook 142, and/or the second hook 144, and a vertical support member 166 removably connectable to the receiving tube 164. The support member 166 may have a top portion 168, a bottom portion 170, and a stop portion 172 between the top portion 168 and the bottom portion 170. The stop portion 172 may be wider than the receiving tube 164 such that the bottom portion 170 of the support member 166 is insertable into the receiving tube 164 up to the stop portion 172. In one embodiment, the support member 166 and the receiving tube 164 may be substantially square shaped tubes. The support member 166 may be a hollow tube or a solid bar. It will be understood that other structures for stopping the support member 166 at a particular point in the insertion in the receiving tube 164 may be used, for example a protrusion or a hole/locking member combination, located between the top portion 168 and the bottom portion 170 of the support member 166.

The bottom portion 170 of the vertical support member 166 may extend beyond the receiving tube 164 when the support member 166 is inserted in the receiving tube 164. The bottom portion 170 of the support member 166 may have at least one aperture 174 configured to receive a locking member 176. Nonexclusive examples of locking members 176 include pins, bolts, hitch pins, clips, retainer clips, and/or combinations thereof. It will be understood that any locking member 176 may be used that is capable of securing the support member 166 from detaching from the receiving tube 164.

It will be understood that the receiving tube 164 may be attached to the apparatus 100 in other locations, such as the rails 132, 134 and/or step 130.

In one embodiment, the apparatus 100 may be constructed of metal, such as steel. The metal may have material properties such that the metal is capable of elastic deformation (that is, spring back) sufficient to allow the metal to move between the non-engagement position and the engagement position. The apparatus 100 may have a rust resistant coating. In one embodiment, the apparatus 100 may be constructed of plastic. However, the apparatus 100 may be constructed of any suitable material or combination of materials capable of supporting the user and withstanding changes between the engagement position and the non-engagement position. In one embodiment, the apparatus 100 may be a colored to enable the user to easily discern the apparatus 100 from the vehicle 104, for example, the apparatus 100 may be yellow, orange or red.

By way of example, in use the apparatus 100 may be mounted on the stake pocket 106 by moving the first and second rails 132, 134 from the engagement position (FIG. 3) to the non-engagement position (FIG. 4), then sliding the hooks 142, 144 past the sides 114, 116 of the stake pocket 106 (i.e., if the hooks 142, 144 extend in an outwardly direction, moving the hooks 142, 144 through the through-hole space of the stake pocket 106, or, as depicted in FIG. 4, if the hooks 142, 144 extend in an inwardly direction, moving the hooks 142, 144 past the exterior of the stake pocket 106). Next the rails 132, 134 are moved back to the engagement position and the hooks 142, 144 are moved to engage the sides 114, 116 of the stake pocket 106, as depicted in FIG. 3. The user may place the locking member 162, such as a pin, in the through-holes 158, 160 of the distal ends 154, 156 of the arms 150, 152 of the hook(s) 142 and/or 144 to secure the apparatus 100 in place, that is, mounted on the stake pocket 106 of the vehicle 104.

The user may then access the vehicle 104 using the apparatus 100 by climbing the step 130 of the apparatus 100. The width of the hooks 142, 144 across the sides 114, 116 of the stake pocket 106 stabilizes the apparatus 100 and limits rotational movement of the apparatus 100 against the side 112 of the vehicle 104 and the rail 110. Additionally, the non-slip texture 146 provides stability for the user.

The apparatus 100 may be mounted on the vehicle 104 with or without the support member 166 inserted in the receiving tube 164. The support member 166 may be inserted in the receiving tube 164 before or after the apparatus 100 is mounted on the stake pocket 106. The user may grasp the support member 166 to assist and stabilize the user in accessing the vehicle 104.

The user may keep the apparatus 100 mounted on the stake pocket 106 while the vehicle 104 is in transit. Because of the substantially coplanar relationship of the step 130, rails 132, 134, and hooks 142, 144, the apparatus 100 does not extend the width footprint of the vehicle 104. Therefore, the vehicle 104 remains in compliance with width regulations.

Figure 7:
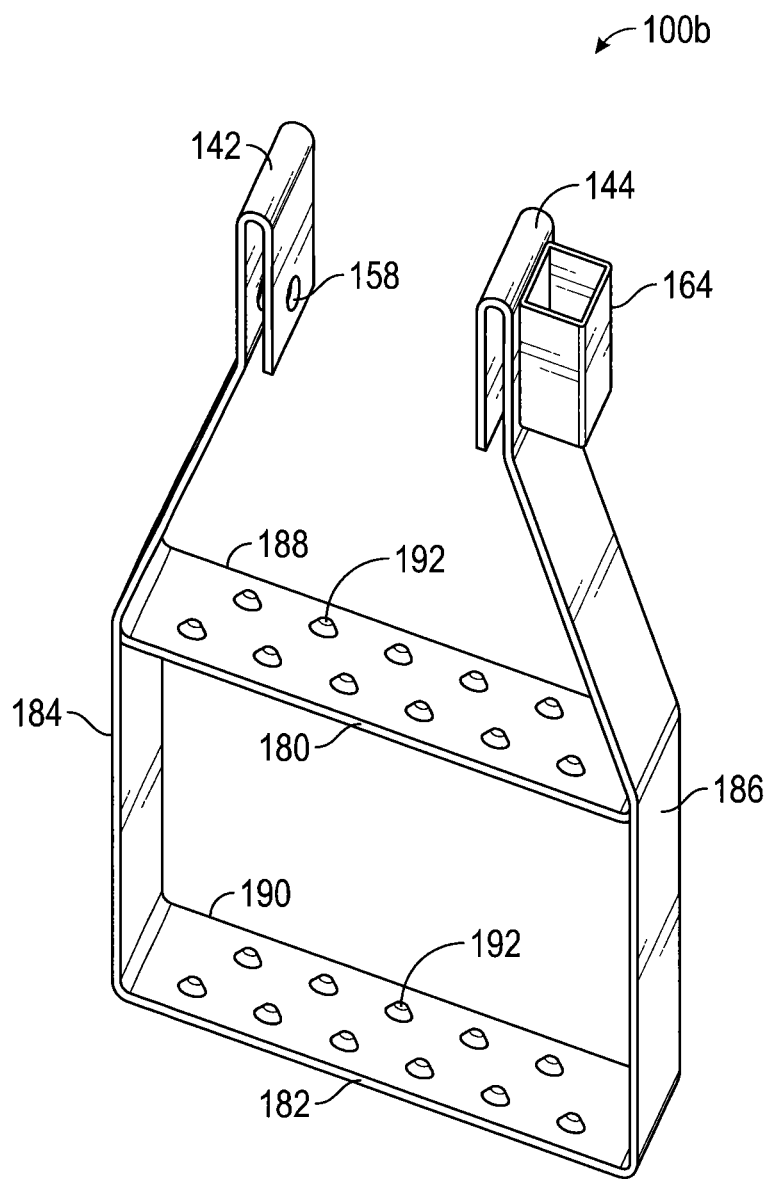
FIG. 7 is a perspective view of another embodiment of an apparatus for accessing an elevated surface of a vehicle.

FIG. 7 illustrates another embodiment of an apparatus 100b constructed in accordance with the inventive concepts disclosed herein. The apparatus 100b is similar in use and construction to the apparatus 100 except as described below. The apparatus 100b has a first step 180, a second step 182, a first rail 184, and a second rail 186. The second rail 186 extends from the first step 180 in a spaced relationship to the first rail 184 so that the first step 180, the first rail 184, and the second rail 186 cooperate to define a first foot receiving space 188. Additionally, the second rail 186 extends from the second step 182 in a spaced relationship to the first rail 184 so that the second step 182, the first rail 184, and the second rail 186 cooperate to define another foot receiving space 190. In one embodiment, the first foot receiving space 188 is substantially triangular. In one embodiment, the second foot receiving space 190 is substantially rectangular. The first step 180 and/or second step 182 may also include a non-slip texture 192.

The first step 180, the second step 182, the first rail 184, the second rail 186, the first hook 142, and the second hook 144 may be in a substantially co-planar relationship. When mounted on the stake pocket 106 of the vehicle 104, the apparatus 100b may be positioned vertically with the stake pocket 106. It will be understood that while only two steps 180, 182 have been depicted in FIG. 7, the apparatus 100b may have additional steps.

While several embodiments of the inventive concepts have been described for purposes of this disclosure, it will be understood that numerous changes may be made which will readily suggest themselves to those skilled in the art and which are accomplished within the spirit of the inventive concepts disclosed and as defined in the appended claims.

What is claimed is:

1. An apparatus for accessing an elevated surface of a vehicle having a stake pocket, the apparatus comprising:
   a step;
   a first rail extending from the step;
   a second rail extending from the step in a spaced relationship to the first rail so that the step, the first rail, and the second rail cooperate to define a foot receiving space;
   a first hook extending from the first rail and configured to engage one side of the stake pocket; and
   a second hook extending from the second rail and configured to engage another side of the stake pocket,
   wherein the first rail and the second rail are angled inwardly toward one another between the step and the first hook and the second hook, and
   wherein the first rail and the second rail are movable relative to one another in a way that the first hook and the second hook are positionable between an engagement position wherein the first hook and the second hook are spaced to supportingly engage opposing sides of the stake pocket and a non-engagement position wherein the first hook and the second hook are spaced relative one another to pass around the sides of the stake pocket.

2. The apparatus of claim 1, wherein the step, the first rail, the second rail, the first hook, and the second hook are in a substantially co-planar relationship.

3. The apparatus of claim 2, wherein the first hook and the second hook extend in an opposing relationship to one another.

4. The apparatus of claim 3, wherein the first hook and the second hook extend in an inwardly direction.

5. The apparatus of claim 4, wherein in the non-engagement position, the first hook and the second hook are spaced apart a greater distance than when the first and second hooks are in the engagement position.

6. The apparatus of claim 3, wherein the first hook and the second hook extend in an outwardly direction.

7. The apparatus of claim 6, wherein in the non-engagement position, the first hook and the second hook are spaced apart a lesser distance than when the first and second hooks are in the engagement position.

8. The apparatus of claim 3, wherein the stake pocket has a first side and a second side extending a width substantially perpendicular to the vehicle, the sides having a top and a bottom, wherein the first and second hooks have a width substantially similar to the width of the stake pocket, and wherein the first and second hooks in the engagement position substantially span the tops of the sides of the stake pocket.

9. The apparatus of claim 3, wherein the stake pocket has a first side and a second side extending a width substantially perpendicular to the vehicle, the sides having a top and a bottom, wherein the first hook has a first arm portion and a second arm portion, the arm portions having distal ends that extend past the sides of the stake pocket in the engagement position, the distal ends having aligned through-holes configured to receive a locking member.

10. The apparatus of claim 3, wherein the step is characterized as a first step, and wherein the apparatus further comprises a second step, and wherein the second rail extends from the second step in a spaced relationship to the first rail so that the second step, the first rail, and the second rail cooperate to define another foot receiving space.

11. The apparatus of claim 10, wherein the first step, the second step, the first rail, the second rail, the first hook, and the second hook are in a substantially co-planar relationship.

12. The apparatus of claim 1, wherein at least a portion of the step has a non-slip texture.

13. An apparatus for accessing an elevated surface of a vehicle having a stake pocket, the apparatus comprising:
   a step;
   a first rail extending from the step, the first rail having an exterior side;
   a second rail extending from the step in a spaced relationship to the first rail so that the step, the first rail, and the second rail cooperate to define a foot receiving space;
   a first hook extending from the first rail and configured to engage one side of the stake pocket;
   a second hook extending from the second rail and configured to engage another side of the stake pocket;
   a receiving tube attached to the exterior side of the first hook; and
   a vertical support member removably connectable to the receiving tube, the support member having a top portion and a bottom portion, and a stop portion between the top portion and the bottom portion, the stop portion wider than the receiving tube such that the bottom portion of the support member is insertable into the receiving tube up to the stop portion, wherein the first rail and the second rail are movable relative to one another in a way that the first hook and the second hook are positionable between an engagement position wherein the first hook and the second hook are spaced to supportingly engage opposing sides of the stake pocket and a non-engagement position wherein the first hook and the second hook are spaced relative one another to pass around the sides of the stake pocket.

14. The apparatus of claim 13, wherein the bottom portion of the vertical support member has a first length and the receiving tube has a second length, the first length longer than the second length, and wherein the bottom portion has at least one aperture configured to receive a locking member.

15. An apparatus, in combination with a stake pocket of a vehicle, for accessing an elevated surface of the vehicle, the apparatus comprising:
 a step;
 a first rail extending from the step;
 a second rail extending from the step in a spaced relationship to the first rail so that the step, the first rail, and the second rail cooperate to define a foot receiving space;
 a first hook extending from the first rail and configured to engage one side of the stake pocket; and
 a second hook extending from the second rail and configured to engage another side of the stake pocket,
 wherein the first rail and the second rail are angled inwardly toward one another between the step and the first hook and the second hook, and
 wherein the first rail and the second rail are movable relative to one another in a way that the first hook and the second hook are positionable between an engagement position wherein the first hook and the second hook are spaced to supportingly engage opposing sides of the stake pocket and a non-engagement position wherein the first hook and the second hook are spaced relative one another to pass around the sides of the stake pocket.

16. The combination of claim 15, wherein each of the first rail and the first hook has an exterior side, and wherein the apparatus further comprises:
 a receiving tube attached to at least one of the exterior side of the first rail and the first hook; and
 a vertical support member removably connectable to the receiving tube, the support member having a top portion and a bottom portion, and a stop portion between the top portion and the bottom portion, the stop portion wider than the receiving tube such that the bottom portion of the support member is insertable into the receiving tube up to the stop portion.

17. The apparatus of claim 16, wherein the bottom portion of the vertical support member has a first length and the receiving tube has a second length, the first length longer than the second length, and wherein the bottom portion has at least one aperture configured to receive a locking member.

18. The apparatus of claim 1, wherein each of the first rail and the first hook has an exterior side, and wherein the apparatus further comprises:
 a receiving tube attached to at least one of the exterior side of the first rail and the first hook; and
 a vertical support member removably connectable to the receiving tube, the support member having a top portion and a bottom portion, and a stop portion between the top portion and the bottom portion, the stop portion wider than the receiving tube such that the bottom portion of the support member is insertable into the receiving tube up to the stop portion.

19. The apparatus of claim 18, wherein the bottom portion of the vertical support member has a first length and the receiving tube has a second length, the first length longer than the second length, and wherein the bottom portion has at least one aperture configured to receive a locking member.

20. An apparatus for accessing an elevated surface of a vehicle having a stake pocket, the apparatus comprising:
 a step;
 a first rail extending from the step;
 a second rail extending from the step in a spaced relationship to the first rail so that the step, the first rail, and the second rail cooperate to define a foot receiving space;
 a first hook extending from the first rail and configured to engage one side of the stake pocket; and
 a second hook extending from the second rail and configured to engage another side of the stake pocket,
 wherein the step, the first rail, the second rail, the first hook, and the second hook are configured in a way that the entirety of the step, the first rail, the second rail, the first hook, and the second hook are in a substantially coplanar relationship with one another,
 wherein the first rail and the second rail are movable relative to one another in a way that the first hook and the second hook are positionable between an engagement position wherein the first hook and the second hook are spaced to supportingly engage opposing sides of the stake pocket and a non-engagement position wherein the first hook and the second hook are spaced relative one another to pass around the sides of the stake pocket.

\* \* \* \* \*